INVENTORS
Lars O. Grondahl and
BY Paul N. Bossart.
THEIR ATTORNEY

INVENTORS
Lars O. Grondahl and
BY Paul N. Bossart.
THEIR ATTORNEY

Patented Apr. 11, 1950 2,503,727

UNITED STATES PATENT OFFICE 2,503,727

MEANS FOR PROVIDING EMERGENCY BREAK-IN OPERATION IN COMMUNICATION SYSTEMS

Lars O. Grondahl, Pittsburgh, and Paul N. Bossart, Cheswick, Pa., assignors to The Union Switch and Signal Company, Swissvale, Pa., a corporation of Pennsylvania Application March 17, 1948, Serial No. 15,288

8 Claims. (Cl. 250—6)

Figure 1:
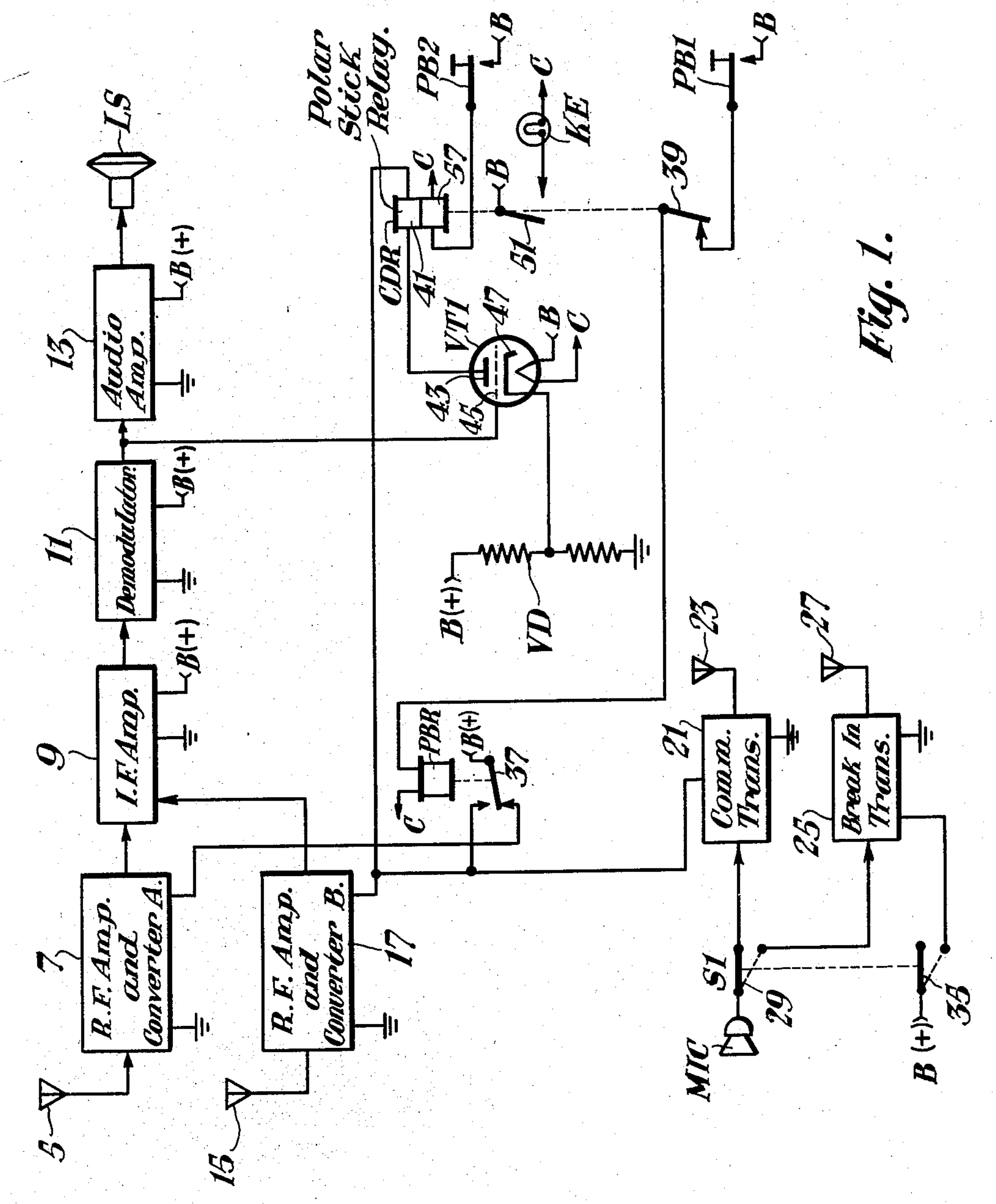

Our invention relates to a communication system, and particularly to communication systems provided with emergency break-in operation.

In communication systems which are operated on the push-to-talk basis, that is, switching from a receiving to a transmitting condition, and vice versa, the situation may occur wherein it is necessary to break-in on a station that is transmitting. For example, in mobile communication systems, such as railway train telephone systems, emergency traffic situations may occur that make it necessary that all stations be contacted simultaneously and without delay to give a warning of a hazardous condition. Railway train telephone systems generally provide a station on spaced vehicles of a train and at wayside towers and communication can be had between the two spaced points of a train, between different trains and between a train and a wayside tower within the communication range. The receiver of each station is retained in an energized condition ready to receive a message during non-communication periods and the transmitter is inactive during the non-communication periods and is energized only during sending periods at that station. Thus the operator of any station can call up and talk with any one or all of the stations within communication range. This arrangement is advantageous when an emergency traffic condition occurs because an operator first to observe the emergency situation can simultaneously warn all trains within the vicinity except in the case a station happens to be sending just the time the emergency warning goes out.

Accordingly, it is an object of our invention to provide an improved communication system arranged for emergency break-in operation.

Another object of our invention is to provide a communication system having an improved break-in apparatus wherewith all active transmitters within the communication range of a given station of the system are automatically rendered inoperative and the respective receivers rendered operative when a break-in signal is sent out from the given station.

A further object of our invention is to provide an improved emergency break-in apparatus for communication systems which employs a separate break-in channel for the operation of the break-in apparatus.

Other objects of our invention and features of novelty will be apparent from the following description taken in connection with the accompanying drawings.

We shall describe two forms of communication systems embodying our invention and shall then point out the novel features thereof in claims.

Figure 2:
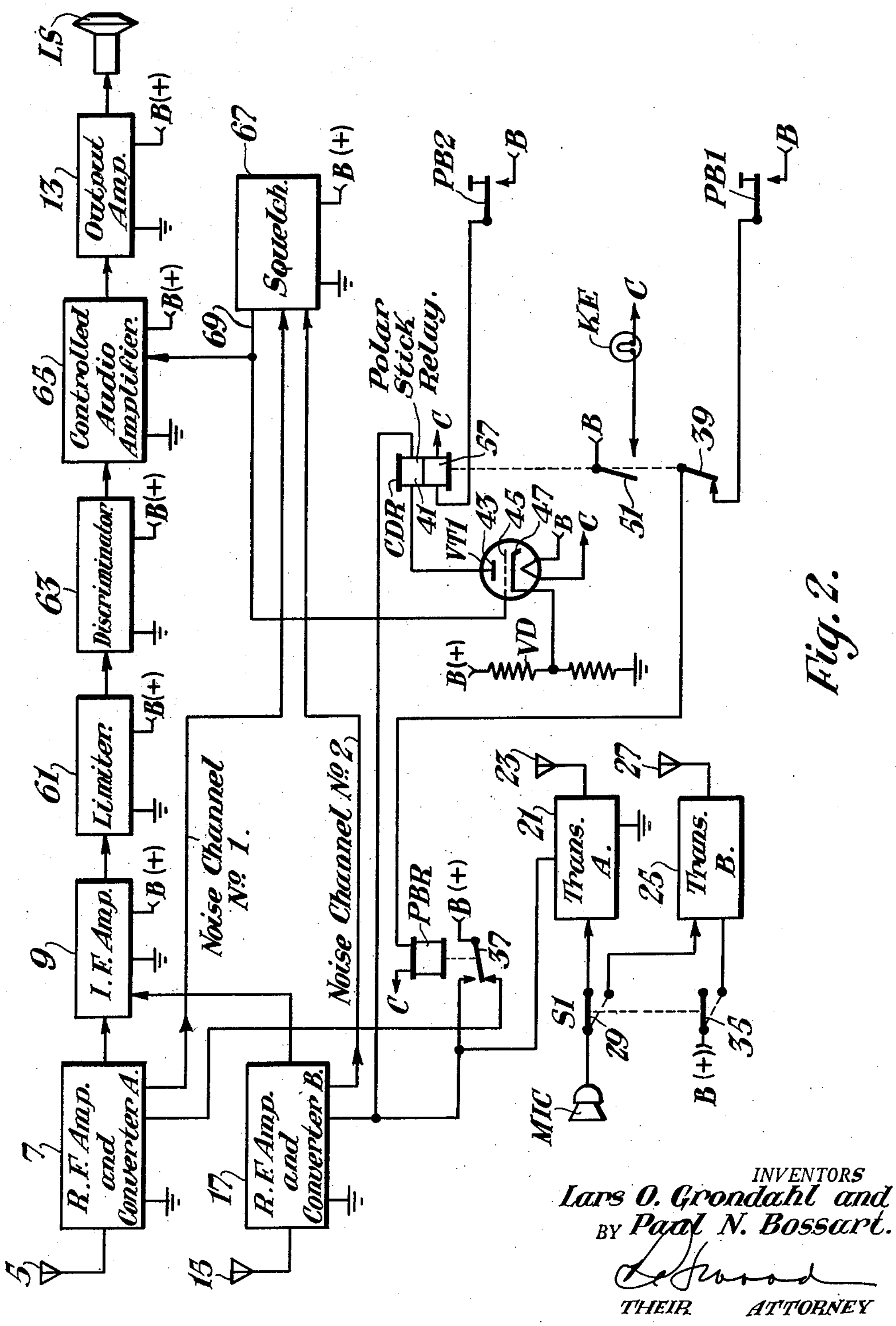

In the drawings,

Fig. 1 shows a diagrammatic view of a station in a communication system having break-in apparatus embodying our invention, when used with a space radio system, and Fig. 2 shows a modification which we may employ in connection with a frequency modulation communication system.

In practicing our invention, we provide, in addition to the usual communication channel, a separate channel which is used for operation of the break-in apparatus. Each station in the communication system is provided with means for transmitting on the break-in channel and receiving means selectively responsive to energy supplied thereto over the break-in channel, in addition to the communication transmitter and receiver usually provided at such stations. The break-in receiving means is governed so that it is conditioned to receive a break-in signal only when the station with which it is associated is transmitting on the normal communication channel.

If, during the time that the station is transmitting on the normal channel, a break-in signal is received, the receiving means operates a warning device to notify the operator that a break-in signal has been received. Additionally, the communication transmitter is switched off, and the communication receiver is switched on automatically to condition the equipment to receive an incoming communication. The apparatus remains in the receiving condition until a resetting means is operated.

Referring to Fig. 1, there is shown a diagrammatic view of a station in a space radio communication system equipped for break-in operation according to our invention.

It is to be understood that our invention is not limited to space radio systems, but may be employed in other types of communication systems, such as, for example, carrier current or inductive communication systems.

As shown, an antenna or some other form of a pick-up device designated by the reference character 5 supplies an incoming signal to a conventional superheterodyne receiver having a first radio frequency amplifier and converter A designated by the reference character 7, which is tuned to a given communication channel frequency, and wherein the modulated carrier signal of the communication channel is amplified and heterodyned to produce a modulated intermediate frequency which is supplied to an intermediate frequency amplifier designated by the reference character 9. The modulated intermediate frequency is then demodulated by a demodulator designated by the reference character 11, and after being amplified by an audio amplifier designated by the reference character 13, the audio signal is supplied to a loud speaker LS. Such an arrangement is entirely conventional, and it is considered unnecessary to describe in detail the construction and operation of the components represented by the labeled rectangles, such a type of receiver being well-known in the art.

A second pick-up device or antenna 15 supplies energy to a second radio frequency amplifier and converter B designated by the reference character 17, and which is arranged and constructed to be responsive to a carrier frequency different from that used for the communication channel and which carrier frequency will hereinafter be referred to as the break-in frequency. The output of the radio frequency amplifier and converter 17 is supplied to the intermediate frequency amplifier 9 and thence to the demodulator 11, the audio amplifier 13, and the loud speaker LS.

From the foregoing it will be seen that energy received on either the communication frequency or the break-in frequency is supplied to an individual radio frequency amplifier and converter, and thereafter is supplied to a common intermediate frequency amplifier, demodulator, audio frequency amplifier, and loud speaker.

The transmitting portion of the equipment comprises a communication channel transmitter designated by the reference character 21 which when energized supplies energy at communication frequency to an antenna 23, and a break-in transmitter designated by the reference character 25 which when energized supplies energy at the break-in frequency to an antenna 27. The transmitters 21 and 25 are modulated by a microphone MIC which is selectively connected to the transmitters by a contact 29 of switch S1. The actual construction of the transmitters 21 and 25 forms no part of our invention, and the transmitters may be constructed and arranged in any manner well-known in the art.

In practicing the invention a single transmitter and a single sending antenna may be used, the transmitter being adjustable to supply either the communication frequency or the break-in frequency.

High voltage direct current energy is supplied to the apparatus from a source not shown, the positive terminal of which is designated by the reference character B(+) and the negative terminal of which is grounded. Low voltage direct current energy is also supplied from a source not shown, the positive terminal of which is designated by the reference character B and the negative terminal of which is designated by the reference character C.

The apparatus also includes a vacuum tube VT1, a call detector relay CDR which is preferably of the polar stick type, a push-to-talk control relay PBR, an indicator lamp KE governed by relay CDR, push buttons PB1 and PB2, and a selector switch S1.

In order to more clearly point out the cooperation of the various elements, the operation of a communication system having stations equipped as shown in Fig. 1 will be described.

The equipment of the station of Fig. 1 as well as the equipment of each of the other stations of the system is normally in a condition to receive over the communication channel, that is, the equipment is normally in the condition shown in Fig. 1. High voltage energy is continuously supplied to the intermediate frequency amplifier 9, demodulator 11 and audio amplifier 13 so that these devices are energized at all times the system is in service. In the normal condition of the equipment high voltage energy is also supplied to the radio amplifier and converter A by a circuit extending from terminal B(+) over back contact 37 of relay PBR and the radio amplifier and converter A to ground.

Accordingly, in the normal condition of the equipment an incoming signal on the communication channel is picked up by the antenna 5, amplified and heterodyned at the radio amplifier and converter A to produce an intermediate frequency having the modulation of the communication energy. The intermediate frequency is then amplified at amplifier 9 and demodulated at demodulator 11 and the resulting audio signal is further amplified at audio amplifier 13 and supplied to the loud speaker LS to reproduce the original message.

If the operator of the station of Fig. 1 desires to transmit a message, he operates the push-to-talk button PB1 and speaks into the microphone MIC. When the push button PB1 is operated, the relay PBR is energized by a circuit which is traced from terminal B over push button contact PB1, contact 39 of relay CDR, and through the winding of relay PBR to terminal C. Accordingly, relay PBR picks up to open the circuit for supplying the high voltage to the radio amplifier and converter A and to close a circuit for applying the high voltage to communication transmitter 21, and which transmitter circuit includes terminal B(+) and front contact 37 of relay PBR. Additionally, high voltage energy is supplied over front contact 37 of relay PBR to the radio frequency amplifier and converter B, and through the upper winding 41 of relay CDR to the plate 43 of vacuum tube VT1.

Thus, operation of the push-to-talk button PB1 results in the radio frequency amplifier and converter A being deenergized, the transmitter 21 and radio frequency amplifier and converter B being energized and power being applied to the tube VT1.

It should be pointed out that the grid 45 of the vacuum tube VT1 is normally biased negative in potential with respect to the cathode 47 of the tube, the cathode 47 being connected to a preselected point of a voltage divider VD connected across the high voltage source and the control grid 45 being connected to a low voltage terminal, not shown, in the output of the demodulator 11. The parts are so proportioned that tube VT1 is normally non-conductive even when the high voltage is applied to its plate 45.

It follows that communication energy will be sent out from the transmitter 21 as the result of the operator closing the push button PB1 and speaking into the microphone MIC.

It will next be assumed that while the operator of the station of Fig. 1 is transmitting, some other station of the system finds it necessary to break in on the transmission. To do so, the operator at this other station will first operate the switch S1 of his station to its lower position so that high voltage is applied to the break-in transmitter 25 of that station over contact 35 of switch S1, and his microphone MIC is connected to the input of the transmitter 25 by contact 29 of switch S1 in its lower position. The operator who wishes to break-in, then speaks into his microphone and a break-in signal is transmitted by his break-in transmitter 25.

Although as herein shown and described the break-in transmitter is voice modulated by energy supplied from the microphone MIC, it is to be understood that the break-in transmitter may be modulated by a distinctive call signal frequency generated by a separate call signal oscillator, if so desired.

At the station of Fig. 1 that is, at the station which is transmitting on the communication channel, the break-in signal is picked up by the antenna 15 and supplied to the radio amplifier and converter B which is now energized. This break-in signal is amplified and converted to intermediate frequency energy and supplied to the intermediate frequency amplifier 9 and thence to demodulator 11. After demodulation the resulting audio frequency break-in signal is supplied to the audio amplifier and to the loud speaker LS.

The positive half cycles of the audio frequency output of the demodulator drive grid 45 of tube VT1 positive in potential with respect to cathode 47 of the tube and the tube will conduct since plate voltage is now applied to its plate 43. The plate current flows in the top winding 41 of relay CDR from right to left as viewed in Fig. 1, and that relay is energized as required to operate its contacts 39 and 51 from their normal or left-hand position to their reverse or right-hand position.

When contact 51 of relay CDR closes in its reverse position, an obvious circuit is established for supplying energy to the warning lamp KE and the lamp is lighted as a visual indication to the operator that a break-in signal has been received.

Additionally, when contact 39 of relay CDR moves to its reverse position it interrupts the circuit previously traced for supplying energy to the relay PBR and relay PBR releases. When relay PBR releases opening its front contact 37 and closing its back contact 37, the supply of high voltage energy to the transmitter 21, radio frequency amplifier and converter B and tube VT1 is interrupted, and high voltage energy is reapplied to the radio frequency amplifier and converter A. Accordingly, it is to be seen that the apparatus of the station of Fig. 1 is automatically switched from its transmitting condition to its receiving condition in response to the receipt of break-in signal energy.

The relay CDR being of the polar stick type having stay-where-put contacts, its contacts 39 and 51 remain in their reverse position subsequent to the removal of plate voltage from tube VT1 and the apparatus is retained in its receiving condition even after the break-in signal has ceased.

The station transmitting the break-in signal may then operate switch S1 to its normal position, to reconnect the high voltage and the microphone MIC to the communication transmitter 21, and thereafter send out his message on the communication frequency, such message being received at the station of Fig. 1 in the usual manner.

It will be seen from the foregoing, that the reception of a signal on the break-in frequency while a station is transmitting causes the transmitter to be switched off and the communication receiver to be switched on, and also warns the operator that another station is breaking in on his transmission by illuminating the warning lamp KE, and sounding a warning at the loud speaker.

At the station where the break-in has taken effect and switched the transmitter off and the communication receiver on, the equipment may be restored to its normal condition by the operation of push button PB2. When push button PB2 is closed, energy is supplied to a lower winding 57 of relay CDR, by a simple circuit. The relay CDR is constructed and arranged so that when energy is supplied to winding 57 and flows therethrough in a direction from left to right, the contacts of the relay will be operated to their left-hand or normal positions. Accordingly, contacts 39 and 51 of relay CDR are moved to their normal positions, thereby extinguishing the warning lamp LE, and reclosing the control circuit for relay PBR so that the relay PBR may be operated to switch the normal communications receiver off and the communications transmitter on.

Referring to Fig. 2, there is shown a station equipped with apparatus embodying our invention, and arranged for frequency modulation operation.

The equipment is similar to that shown in Fig. 1, with the exception that the transmitters 21 and 25 are of the frequency modulation type, and the receiver includes the usual limiter 61, discriminator 63, controlled audio amplifier 65 and noise suppressor or squelch 67. The squelch 67 is of a type which employs a noise channel supplied from the radio frequency amplifier, and accordingly a separate noise channel is provided for each of the two radio frequency amplifiers 7 and 17. It will be apparent that the squelch will be supplied with noise energy only from the radio frequency amplifier which is operating, since the power supplied to the other radio frequency amplifier is cut off, as a result of the operation of contact 37 of relay PBR.

The grid 45 of vacuum tube VT1 is supplied with energy by a circuit connected in multiple with the circuit by which the noise suppressor or squelch 67 governs the controlled audio amplifier 65. That is, when a carrier wave, modulated or unmodulated, is picked up from either channel, the squelch 67 operates to put a potential on the connection 69 to thereby energize the controlled audio amplifier 65, so that the audio frequency energy is amplified and supplied to the loud speaker LS to reproduce the message. Additionally, when energy is supplied over the connection 69 to the controlled audio amplifier 65, it is also supplied to the grid 45 of tube VT1 to thereby render the tube conductive if plate potential is being supplied thereto.

From the foregoing, it will be seen when the station is transmitting and contact 37 of relay FBR is picked up, an incoming signal on the break-in channel will cause the squelch 67 to operate to pass the audio signal to the output amplifier and will also supply a potential to the grid 45 of tube VT1 sufficient to overcome the bias supplied to the cathode 47 by the voltage divider VD. As a result, tube VT1 is rendered conductive and operates the relay CDR, so that the transmitter is cut off and a warning is given that a break-in operation has occurred.

The operation of the equipment under other conditions is similar to that previously described for the equipment shown in Fig. 1, except that with the arrangement as shown in Fig. 2, the break-in transmitter B need not be modulated when transmitting a break-in signal, since the squelch circuit at the other station will operate on the reception of an unmodulated carrier as well as a modulated carrier signal.

Although we have herein shown and described only two forms of communication systems embodying our invention, it is to be understood that various changes and modifications may be made therein within the scope of the appended claims without departing from the spirit and scope of our invention.

Having thus described our invention, what we claim is:

1. In a communication system, in combination, a first transmitter and a first receiver operative at a first carrier frequency, a second transmitter and a second receiver operative at a second carrier frequency, a call detector relay governed by said second receiver and having contacts which are operated from a first to a second position in response to a signal received by said second receiver, a control relay having contacts which occupy a first or a second position according as the winding of said control relay is energized or deenergized, a circuit for supplying energy to the winding of said control relay including a contact of said call detector relay closed in its first position, a circuit including a second position contact of said control relay for supplying energy to said first receiver, a circuit including a first position contact of said control relay for supplying energy to said first transmitter and said second receiver, means for at times supplying energy to said second transmitter, and restoring means for operating the contacts of said call detector relay from said second to said first position.

2. In a communication system, in combination, a first transmitter and a first receiver operative at a first carrier frequency, a second transmitter and a second receiver operative at a second carrier frequency, a call detector relay governed by said second receiver and having contacts which are operated from a first to a second position in response to a signal received by said second receiver, a control relay having contacts which occupy a first or a second position according as the winding of said control relay is energized or deenergized, a circuit for supplying energy to the winding of said control relay including a contact of said call detector relay closed in its first position, a circuit including a second position contact of said control relay for supplying energy to said first receiver, a circuit including a first position contact of said control relay for supplying energy to said first transmitter and said second receiver, restoring means for operating the contacts of said call detector relay from said second to said first position, and a warning device governed by a contact of said call detector relay.

3. In a communication system, in combination, a first transmitter and a first receiver operative at a first carrier frequency, a second transmitter and a second receiver operative at a second carrier frequency, a call detector relay governed by said second receiver and having contacts which are operated from a first to a second position in response to a signal modulated in a distinctive manner received by said second receiver, a control relay having contacts which occupy a first or a second position according as the winding of said control relay is energized or deenergized, a circuit for supplying energy to the winding of said control relay including a contact of said call detector relay closed in its first position, a circuit including a second position contact of said control relay for supplying energy to said first receiver, a circuit including a first position contact of said control relay for supplying energy to said first transmitter and said second receiver, means for at times supplying energy to said second transmitter and modulating said second transmitter in said distinctive manner, and restoring means for operating the contacts of said call detector relay from said second to said first position.

4. In a communication system, in combination, a first transmitter and a first receiver of the frequency modulation type and operative at a first carrier frequency, a second transmitter and a second receiver of the frequency modulation type and operative at a second carrier frequency, a call detector relay governed by said second receiver and having contacts which are operated from a first to a second position in response to energy of said second frequency received by said second receiver, a control relay having contacts which occupy a first or a second position according as the winding of said control relay is energized or deenergized, a circuit for supplying energy to the winding of said control relay including a contact of said call detector relay closed in its first position, a circuit including a second position contact of said control relay for supplying energy to said first receiver, a circuit including a first position contact of said control relay for supplying energy to said first transmitter and said second receiver, means for at times supplying energy to said second transmitter, and restoring means for operating the contacts of said call detector relay from said second to said first position.

5. In a communication system which utilizes the same communication channel for transmission in both directions and operates on a push-to-talk basis, the combination comprising a station equipped with a transmitter and a receiver operative on said communication channel, a push-to-talk element operable to a given position to render said communication channel transmitter active and said communication channel receiver inactive, a break-in receiving means at said station operating on a break-in channel different from said communication channel, means controlled by said push-to-talk element at said given position to render said break-in receiving means operative, and relay means governed by said break-in receiving means to switch said communication transmitter inactive and said communication receiver active independent of said push-to-talk element in response to a break-in channel signal received by said break-in receiving means.

6. In a communication system which utilizes the same communication channel for transmission in both directions and operates on a push-to-talk basis, the combination comprising, a station equipped with a transmitter and a receiver operative on said communication channel, circuit means including a push-to-talk element effective to energize said transmitter and deenergize said receiver in response to the operation of said push-to-talk element to a given position, receiving means at said station operative on a break-in channel different from said communication channel, said receiving means made operative by said circuit means at said given position of said push-to-talk element, an electron tube at the station normally biased to a non-conductive condition, said receiving means effective to overcome said normal bias and render said tube conductive in response to a break-in channel signal, and a relay governed by the conductive condition of said tube to control said circuit means for energizing said receiver and deenergizing said transmitter independent of said push-to-talk element.

7. In a communication system which utilizes the same communication channel for transmission in both directions and operates on a push-to-talk basis, the combination comprising a station equipped with a transmitter and a receiver operative on said communication channel, circuit means including a push-to-talk element effective to energize said transmitter and deenergize said receiver in response to the operation of said push-to-talk element to a given position, receiving means at said station operative on a break-in channel different from said communication channel, said receiving means made operative by said circuit means at said given position of said push-to-talk element, an electron tube at the station normally biased to a non-conductive condition, said receiving means effective to overcome said normal bias and render said tube conductive in response to a break-in channel signal, a stick relay governed by said tube and having contacts operated from a first to a second position in response to the conductive condition of said tube, a warning indicator governed by a contact of said relay closed in its second position, said circuit means controlled by a contact of said relay closed in its second position to energize said receiver and deenergize said transmitter, and reset circuit means to at times operate the contacts of said relay from their second to their first position.

8. In a communication system which utilizes the same communication channel for transmission in both directions and operates on a push-to-talk basis, the combination comprising a station equipped with transmitting means and receiving means, said transmitting means operable when energized to supply said communication channel energy; said receiving means including a first and a second high frequency amplifier and converter which are connected in multiple to a constantly energized intermediate frequency amplifier and demodulator; said first high frequency amplifier and converter when energized responsive to said communication channel energy, said second high frequency amplifier and converter when energized responsive to a break-in channel energy different from said communication channel energy, circuit means including a push-to-talk device to either energize said first high frequency amplifier and converter or to energize said transmitting means and said second high frequency amplifier and converter according as said push-to-talk device is set at a first or a second position, and relay means governed jointly by said circuit means with the push-to-talk device set at said second position and by said demodulator to energize said first high frequency amplifier and converter and deenergize said transmitting means in response to a break-in channel signal received at said station.

LARS O. GRONDAHL.
PAUL N. BOSSART.

REFERENCES CITED

The following references are of record in the file of this patent:

UNITED STATES PATENTS

| Number | Name | Date |
|---|---|---|
| 1,608,969 | Webbe | Nov. 30, 1926 |
| 2,202,432 | Santucci | May 28, 1940 |
| 2,280,420 | Chappell | Apr. 21, 1942 |
| 2,407,846 | O'Brien | Sept. 17, 1946 |
| 2,408,878 | Preston | Oct. 8, 1946 |